United States Patent [19]
Tanaka

[11] 3,810,227
[45] May 7, 1974

[54] SHUTTER RELEASE LOCKING DEVICE FOR CAMERA

[75] Inventor: Harumi Tanaka, Kobe, Japan

[73] Assignee: Minolta Camera Kabushiki Kaisha, Osaka, Japan

[22] Filed: June 1, 1972

[21] Appl. No.: 258,565

[30] Foreign Application Priority Data
June 8, 1971  Japan.......................... 46-4648175

[52] U.S. Cl................. 95/11 R, 95/31 EL, 95/53 R
[51] Int. Cl. .......................................... G03b 19/00
[58] Field of Search......... 95/11 V, 11, 31 EL, 53 R

[56] References Cited
UNITED STATES PATENTS
| | | | |
|---|---|---|---|
| 3,439,596 | 3/1969 | Peterson et al.................. | 95/31 EL |
| 3,425,527 | 2/1969 | Striper et al..................... | 95/31 EL |
| 3,693,524 | 9/1972 | Fuiseta............................ | 95/31 EL |

OTHER PUBLICATIONS
Beach, Def. Pub. of Serial No. 113, 874, filed Feb. 9, 1971, published in 896 O.G. 19, on 3/7/1972, Def. Pub. No. T896, 020.

*Primary Examiner*—Samuel S. Matthews
*Assistant Examiner*—E. M. Bero
*Attorney, Agent, or Firm*—Wolder & Gross

[57] ABSTRACT

A device has a lens protecting plate disposed at the front side of an exposure window in horizontally movable manner for opening and closing the window and a shutter release locking member serving also as a first contact member of a switch for opening and closing a power source circuit for an exposure amount control device and the like. While the exposure window is closed, the locking member locks a shutter release member and keeps the switch open, whereas when the exposure window is opened, the locking member is moved in operative relation to the protecting plate at the final stage of its opening action to unlock the shutter release member and close the switch.

9 Claims, 3 Drawing Figures

SHUTTER RELEASE LOCKING DEVICE FOR CAMERA

BACKGROUND OF THE INVENTION

The present invention relates to a shutter release locking device for camera, more particularly to a device for use in an ultra-miniature camera using a 16 mm (⅝") film by which the shutter release member is locked to avoid blind exposures and a power source switch for the exposure amount control means and the like is turned off simultaneously with the closing of the exposure window when no photographs are taken.

With a miniature camera of this type, a mechanism is known wherein a lens protecting plate disposed in front of the take lens in horizontally movable manner is adapted to close the exposure window, with a member acting to lock the shutter button in operative relation with the protecting plate, when no photographs are taken. Another mechanism of the type described is also known for use with a camera incorporating a battery serving as a power source for the exposure amount control means and like, wherein a switch for the power source is closed and opened by the horizontal travel of the protecting plate so as to cut off the power source to prevent its drain when photographs are not taken. Also known is a device including both mechanisms above.

However, being intended for different purposes, these two mechanisms are independent of each other with respect to the constituent members, with the resulting increase in the number of parts included in the camera to restrict the freedom of camera design in case of miniatures such as already mentioned and render the camera more costly to manufacture.

Furthermore, since the two mechanisms are both associated with the movement of the lens protecting plate, they must be operatively correlated in one way or another, hence the need for adjustment. However, it is difficult to make adjustment because of the difference in the position of their installation. Thus the camera is subject to the malfunction that although it is adjusted for a proper exposure with the power source turned on by the movement of the lens protecting plate, the shutter fails to effect an exposure or, conversely, the shutter is released when exposure adjustment has not been made with the power source turned off. In fact, it is very difficult to operate the two mechanisms in timed relation and, even if established, the timed relation is liable to be disturbed.

SUMMARY OF THE INVENTION

An object of this invention is to provide a device for use in a miniature camera such as referred to above wherein shutter release locking means and means for opening and closing a power source switch for exposure amount control means comprises common operating members so as to construct the desired device with a reduced number of parts for simplification of its construction and thereby reduce the space to be occupied by the device for greater freedom of design.

Another object of this invention is to provide a miniature camera such as referred to above wherein the foregoing two means are constructed of common parts so as to render both means more readily adjustable for a timed operation without permitting them to be out of timed relation and to make them free of malfunction.

According to the present invention, means having the foregoing two functions are built into one mechanism with a materially reduced number of constituent parts to assure a simplified construction, greater freedom in design, easy adjustment to render the means operatively correlated, operation with stable timing and freedom from malfunction such as already described.

Through giving the aforementioned two functions to one shutter release locking member that is operatively associated with the lens protecting plate, locking of the shutter release member and opening and closing of power source switch for the exposure amount control means can be effected in the most preferable timed relation to opening and closing of the lens protecting plate, whereby it is assured that the camera will operate properly, insofar as trouble-free operation of the lens protecting plate is ensured. Other object and features of this invention will bcome more apparent from the following detailed description.

DESCRIPTION OF THE PREFERRED EMBODIMENTS

Figure 1:
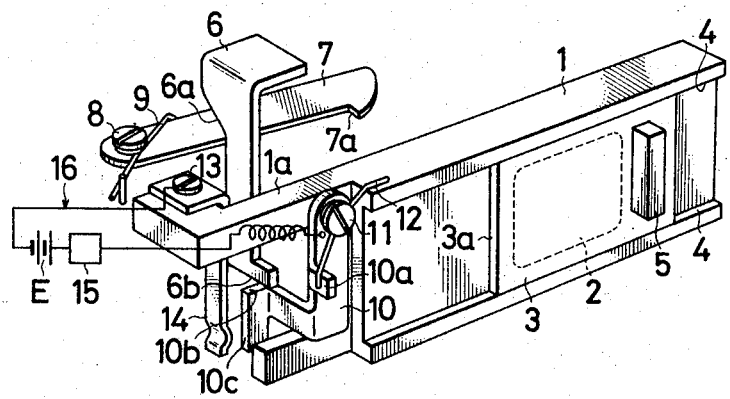
FIG. 1 is a perspective view showing principal parts of an embodiment of this invention, with the exposure window of camera closed by a lens protecting plate.
Figure 2:
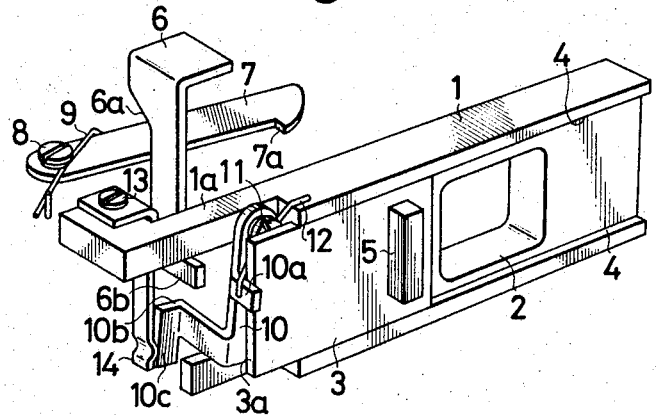
FIG. 2 is a perspective view showing the embodiment of FIG. 1 ready for shutter release with the exposure window opened.

Referring to FIGS. 1 and 2, a holder frame 1 having an exposure window 2 is disposed at the front of an unillustrated camera body. The frame 1 is formed along its upper and lower edges with guides 4 for holding a lens protecting plate 3 in horizontally slidable manner. Attached to the front face of the protecting plate 3 is knob 5, by which the protecting plate 3 is moved to open the window 2 when a photograph is taken, while the plate 3 closes the window 2 to protect the lens when pictures are not taken.

A shutter release member 6 is supported on the camera body for upward and downward movement. Depression of the shutter release member 6 causes its slanting edge 6a to come into contact with a shutter release lever 7 to rotate the lever 7 in a counterclockwise direction, permitting a hook 7a at the front end of the lever 7 to release an unillustrated shutter actuating member into operation which has been retained by the hook 7a through a shutter cocking action. The shutter release lever 7 pivoted at 8 to a suitable portion of the camera body is urged by a spring 9 in a clockwise direction.

A shutter release locking member 10 pivoted at 11 to an arm 1a of the frame 1 is urged by a spring 12 in a counterclockwise direction and is so disposed that a driven portion 10a projecting from the member 10 is positioned in the path of travel of the protecting plate 3. Thus when the protecting plate 3 is moved in a direction to open the exposure window 2, an end edge 3a of the protecting plate 3 comes into contact with the driven portion 10a at the position where the protecting plate 3 almost completes its action to open the window 2. The locking member 10 is thereafter forced into clockwise rotation through the driven portion 10a.

When the protecting plate 3 starts to close the exposure window 2, the locking member 10 follows the protecting plate 3 by way of the driven portion 10a to rotate in a counterclockwise until it is stopped by an unillustrated stopper or the like when the protecting plate 3 has travelled a certain distance. The protecting plate 3 alone is thereafter moved in the closing direction.

The shutter release locking member 10 has a locking portion 10b which is positioned under the lower edge 6b of the shutter release member 6 to prevent downward movement of the member 6 and thereby lock the shutter against releasing while the exposure window is kept closed and which is retracted from under the release member 6 to permit the member 6 to move down for shutter release when the window has completely been opened. The shutter release locking member 10 further has a contact portion 10c to be spaced apart by a given distance from and thereby kept out of electrical contact with a second contact member 14 on the frame 1 while the exposure window 2 is kept closed, the second contact member 14 being made of a spring plate or the like and secured by a screw 13 or the like to the distal end of arm 1a of the frame 1. When the locking member 10 is pushed by the protecting plate 3 just before the protecting plate completely opens the window 2, the contact portion 10c is urged into electrical, pressing contact with the second contact member 14, which in turn resiliently acts on the contact portion 10c. Thus, the locking member 10 serves as a first contact member in opposing relation to the second contact member 14 to constitute a switch therewith.

The switch terminals of an electric circuit 16 including a power source E, exposure amount control means 15, etc. are connected to the first and second contact members 10 and 14 respectively, the power source 14 thus being adapted to be turned on and off by the switch comprising the first and second contact members 10 and 14.

In the construction described, both first and second contact members are of course mounted on the frame 1 in electrically insulated manner, and they must be electrically insulated also from the lens protecting plate 3. Accordingly, in the case where the locking member 10 and second contact member 14 are made of an electrically conductive material, the frame 1 and protecting plate 3 may be made of an electrically insulating material such as plastics. The locking member 10 serving as a first contact member may alternatively be so constructed that its contact portion 10c alone is made of an electrically conductive material which is electrically insulated from the other portions. The terminal of the foregoing circuit may then be electrically connected to this portion.

It will be apparent from the above description that if the exposure window 2 is closed by operating the lens protecting plate 3 when no photographs are taken, the shutter release locking member 10 is urged by the spring 12 into counterclockwise direction and is latched at the position shown in FIG. 1, whereby the shutter release member 6 is locked by the locking portion 10b against downward movement to prevent shutter release. At the same time, the first contact member, i.e., locking member, and second contact member 14 serving as the switch for the electric circuit 16 are separated from each other to turn off the power source E to prevent drain of the battery.

When the exposure window 2 is opened by moving the lens protecting plate 3 to take a photograph, the protecting plate 3 pushes the shutter release locking member 10 into a clockwise rotation just before the opening action is completed, causing the locking portion 10b to be retracted from under the shutter release member 6 to make the member 6 ready for depression or shutter release action. At the same time, the contact portion 10c is pressed against the second contact member 14 to close the electric circuit and operate the exposure amount control means and the like.

The object of this invention can be achieved by the simplest construction in the case where one member comprising the shutter release locking member 10 effects locking and release of the shutter release member 6 and turning on and off of the power source as described above. However, the present invention is not limited to the abovedescribed construction. For instance, the locking member 10 may alternatively be operated slidably or in some other suitable fashion. Further the second contact member 14 need not be limited only to a spring plate. However, if the second contact member 14 is made of a spring plate or the contact portion 10c of the locking member 10 serving as the first contact member is provided with springlike properties, freedom will be imparted to the movement of the lens protecting plate 3 after the first contact member comes into contact with the second contact member, only by suitably setting the timing of contact between the two contact members, with more perfect contact assured between the contact members. Further the spring 12 acting on the shutter release locking member 10 helps the locking member 10 accurately follow the movement of the lens protecting plate 3 during the exposure window closing operation and assures opening of the switch between the first and second contact members and locking action on the shutter release member.

Figure 3:
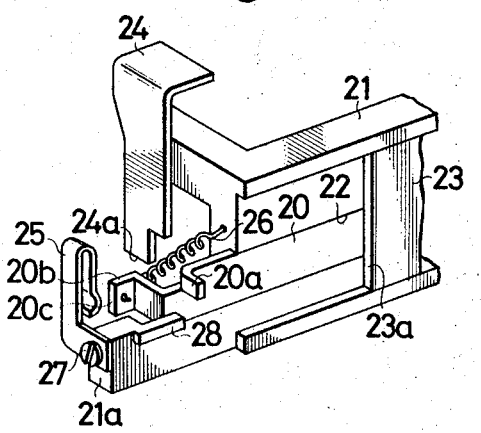
FIG. 3 is a perspective view showing principal parts of another embodiment of this invention, with its exposure window closed.

FIG. 3 shows an embodiment inclding a shutter release locking member 20 which is slidable.

The shutter release locking member 20 is slidably retained in a guide groove 22 in the front of a holder frame 21 and is so positioned that a driven portion 20a thereof is engageable with an end edge 23a of a lens protecting plate 23 retained on the frame 21 with the same timing as in the embodiment of FIGS. 1 and 2.

The locking member 20 has a locking portion 20b which is brought to a position under the lower edge 24a of a shutter release member 24 to prevent the downward movement of the member 24 while an exposure window (not shown) is closed by the lens protecting plate 23 and which is retracted from under the lower edge 24a to permit the downward movement of the release member 24 when the locking member 20 is pushed and displaced by the protecting plate 23 by way of the driven portion 20a just before the protecting plate completes an exposure window opening action. The locking member 20 further includes a contact portion 20c in opposing relation to a second contact member 25 of a switch for the electric circuit for exposure amount control means and spaced apart from the second contact member 25 while the exposure window is closed, the contact portion 20c being adapted to come into contact with the second contact member 25 to close the switch when the locking member 20 is moved during an exposure window opening action. The locking member 20 is urged by a spring 26 to follow the movement of the protecting plate 23 up to the locking position when the protecting plate 23 is moved in a direction to close the exposure window.

As shown in the drawing, the second contact member 25 is secured by a screw 27 to the distal end of arm 21a of the frame 21, the contact member 25 per se being bent in a U-shape so as to assure greater resiliency. A stopper 28 is provided for the protecting plate 23.

The shutter release locking member 20 serving as a first contact member and the second contact member 25 are connected to the opposite terminals of switch of the electric circuit. Thus the shutter release locking member 20 is operated in operative relation to closing and opening of the exposure window, and the power source for the exposure amount control means is turned on and off in operative relation to unlocking and locking of the shutter release member 24 as already described.

The frame 21 and the protecting plate 23 in the embodiment of FIG. 3 may preferably be made of an electrically insulating material.

Although the foregoing embodiments have the construction wherein the locking portion of the shutter release locking member 10 or 20 is positionable under the lower edge of the shutter release member 6 or 24 to lock and unlock the release member, an alternative construction may comprise a shutter release member which, for instance, is provided at its suitable portion with a projection, lug or the like that it engageable with the locking portion to effect locking and prevent a release action.

What is claimed is:

1. In a camera including a body having a window providing light access to the camera lens and a shutter, a shutter release member movable between a retracted position not releasing said shutter and an advanced shutter release position releasing said shutter and an electrical circuit associated with the operation of said camera, a cover member mounted on said body and manually movable between an advanced position covering said window and a retracted position uncovering said window, and normally open switch means for connecting said circuit to a source of current and including a first contact, and a locking member provided with a second contact normally spaced from said first contact with said locking member positioned to lock said shutter release member in its retracted position and said locking member being movable in response to the full retraction of said cover member to bring said second contact into engagement with said first contact member to close said switch and to unlock said shutter release member for advance from its retracted position.

2. The camera of claim 1 wherein said locking member includes a portion thereof normally located in the path of the retracted shutter release member when said cover member is in advance of its retracted position and is moveable out of said path in response to the full retraction of said window member.

3. The camera of claim 2 wherein said cover member is slideable between its retracted and advanced positions.

4. The camera of claim 3 wherein a portion of said locking member is located in the path of said cover member and is engaged and moved by said cover member with the retraction thereof.

5. The camera of claim 4 wherein said locking member is swingably supported.

6. The camera of claim 4 wherein said locking member is slideably supported for movement in the direction of movement of said cover member.

7. A photographic camera including an electric circuit and a power source associated with the operation of said camera comprising:
   a camera body,
   a holder frame located on said camera body and having a window positioned in the path of the camera incident photographic light, a lens cover plate slidably supported by said frame for manual shifting between positions opening or closing said window,
   a shutter release member,
   a switch connected between said electric circuit and said power source and including a first contact,
   a member movable by shifting said lens covering plate, said member serving as the other contact of said switch and also as preventing means for preventing downward movement of said shutter release member and beimg so positioned as to prevent the downward movement of said shutter release member and to be spaced from said other contact by the closing movement of said lens cover plate and also to release the prevention of the downward movement of said shutter release member and to be connected with said first contact by the opening movement of said lens cover plate.

8. The device as set forth in claim 4 wherein said member movable by shifting said lens cover plate is pivoted to part of a holder frame retaining said lens cover plate.

9. The device as set forth in claim 4 wherein the shutter release locking member is slidably retained on a holder frame holding said lens cover plate.

* * * * *

UNITED STATES PATENT OFFICE
CERTIFICATE OF CORRECTION

Patent No. 3,810,227　　　　　　　　　　Dated May 7, 1974

Inventor(s) Harumi Tanaka

It is certified that error appears in the above-identified patent and that said Letters Patent are hereby corrected as shown below:

--[30]  Foreign Application Priority Data

June 8, 1971　　Japan............46-48175--

Signed and sealed this 1st day of October 1974.

(SEAL)
Attest:

McCOY M. GIBSON JR.　　　　　　　　　C. MARSHALL DANN
Attesting Officer　　　　　　　　　　Commissioner of Patents